April 12, 1938.　　　　L. J. DE LANTY　　　　2,113,783
TESTING DEVICE FOR SEARCH UNITS OF FLAW DETECTORS
Filed Oct. 27, 1933　　　2 Sheets-Sheet 1

Inventor
LOREN J. DELANTY
By
Joseph H. Lipschutz
Attorney

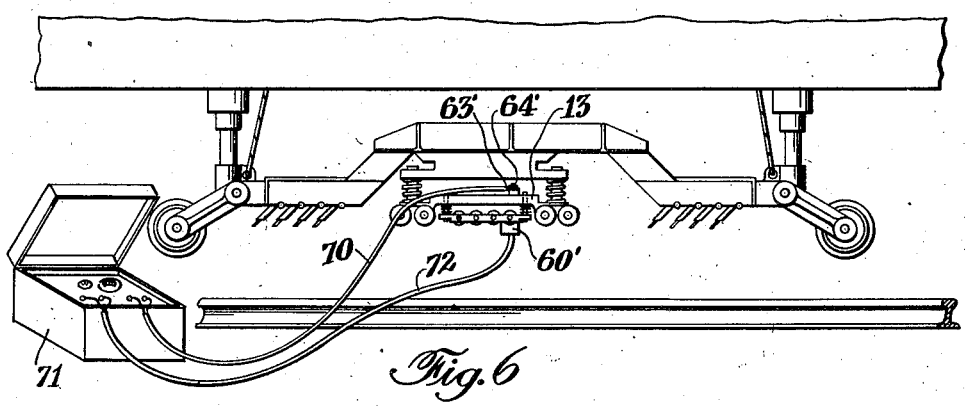
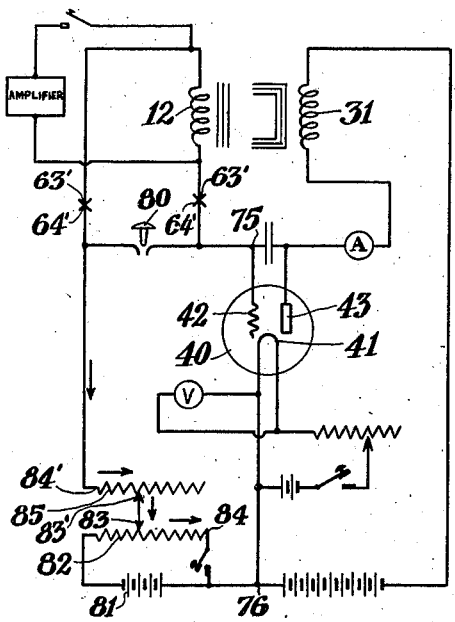
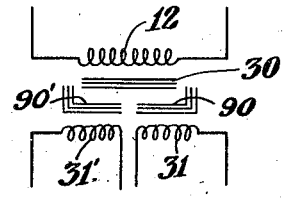
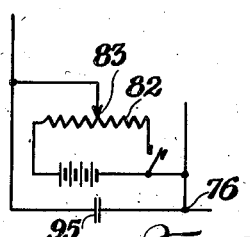
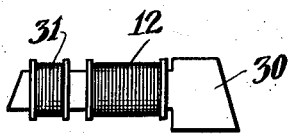

Patented Apr. 12, 1938

2,113,783

UNITED STATES PATENT OFFICE 2,113,783

TESTING DEVICE FOR SEARCH UNITS OF FLAW DETECTORS

Loren J. De Lanty, Spring Valley, N. Y., assignor to Sperry Products, Inc., Brooklyn, N. Y., a corporation of New York Application October 27, 1933, Serial No. 695,494

3 Claims. (Cl. 175—183)

This invention relates to a method of, and means for, testing the searching units of flaw detector mechanisms of the type employed in the Sperry rail flaw detector cars. It is now well-known that the principle employed by the Sperry flaw detector cars is the movement of a plurality of coils in constant space relation to a conductor through which current is passed. If the conductor is of homogeneous structure the coils will cut a constantly equal number of lines of force surrounding the conductor and no E. M. F. will be generated. However, when a region of flaw is encountered, the electromagnetic field surrounding the conductor in that region is distorted from normal and the coils will cut a different number of lines of force on entering the said region, and this variation in the number of lines of force cut by the coils will generate an E. M. F. in the coils, which, after being suitably amplified, may be caused to operate an indicator such as a recorder.

The above method depends upon the perfection of the coil formation, for, should the coil become externally shorted, totally or partially, as by a resistance due to dirt across the terminals of the coil, or should the circuit through the coil be completely broken, or should even a certain number of turns of said coil become internally shorted, as by breakdown of the insulating medium between turns of the coil, then obviously an error is introduced and the detector system is either partially or wholly rendered inoperative by reduction of the voltage output of the coil affected, or by electrical unbalance of the pair of coils containing the affected coil.

The detector coils comprising the search unit are enclosed in various enclosing means depending upon the type of search unit employed. Thus the coils may be contained in Bakelite or in metallic, non-magnetic casings. It is the principal purpose of my invention to provide a means whereby the electrical excellence of the searching coils may be readily detected by a suitable testing means without dismantling the coil from its casing or the casing from its mounting. For this purpose I utilize the broad principle of creating and causing the tested coil or coils to vary an oscillatory circuit.

Further objects and advantages of my invention will become apparent in the following detailed description thereof.

In the accompanying drawings,

Fig. 3 is a view of one of the elements of the searching unit of Fig. 1, showing the relative positioning of the coils of Fig. 2 in juxtaposition to establish the oscillatory circuit.

Fig. 5 is a wiring diagram of a modified form showing a modification of my testing device.

Fig. 6 is a view similar to Fig. 1, showing another application of the same testing principle.

Fig. 7 is a portion of a wiring diagram showing a modified principle of testing.

Fig. 8 is a wiring diagram, similar to a portion of Fig. 5, showing an alternative method of compensating for variations in resistance.

Figure 1:
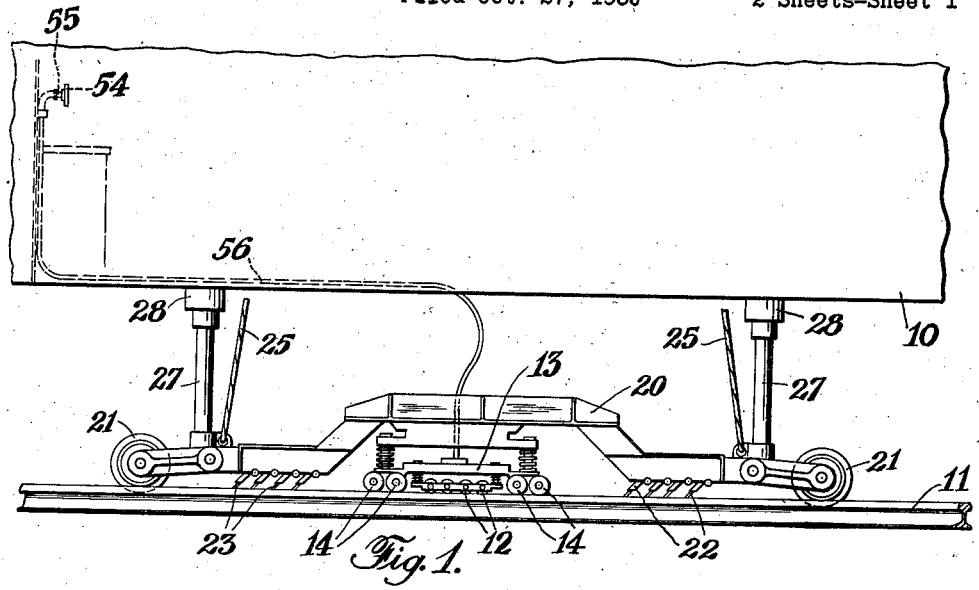
Fig. 1 is a side elevation of a portion of a Sperry rail flaw detector car showing a portion of the mechanism applied thereto which is utilized in testing the coils.

Referring to Fig. 1, I have shown a portion of a Sperry rail flaw detector car having a car body 10 adapted to travel over rails 11. Flaws within the rail are detected by means of detector coils which, in this instance, are shown as enclosed in drum casings 12, said coils forming a search unit supported upon a detector carriage 13, adapted to ride on the rails by means such as rollers 14. The detector carriage is in turn supported upon the current brush carriage 20, which is adapted to ride on the rails by means such as rollers 21 and is provided with current brushes 22, 23 for leading current from a generator (not shown) within the car body into and out of the rail. Said current brush carriage 20 may be raised to inoperative position by means such as springs (not shown) and cables 25, and may be lowered to operative position in engagement with the rail by means such as fluid pressure pistons 27, operating within fluid pressure cylinders 28, to which compressed fluid may be supplied. As the car travels over the rails the current supplied thereto creates an electromagnetic field surrounding the same, said field being uniform so long as the rail does not contain a flaw, but being distorted in the region of flaw. The said coils cut a constantly equal number of lines of force, as hereinbefore explained, except when entering and leaving a region of flaw, at which time they cut different numbers of lines of force to generate an E. M. F., which, after being suitably amplified, is caused to operate an indicator. I have shown a form of search unit wherein the coils are connected in pairs, each pair consisting of equal and oppositely wound coils (see Fig. 2 showing one such pair diagrammatically) so that variations in current supply will have no resultant effect upon the pair of coils.

As shown in Fig. 1, each coil is enclosed within a cylinder which may be a metal casing from which the coil itself is insulated.

Figure 2:
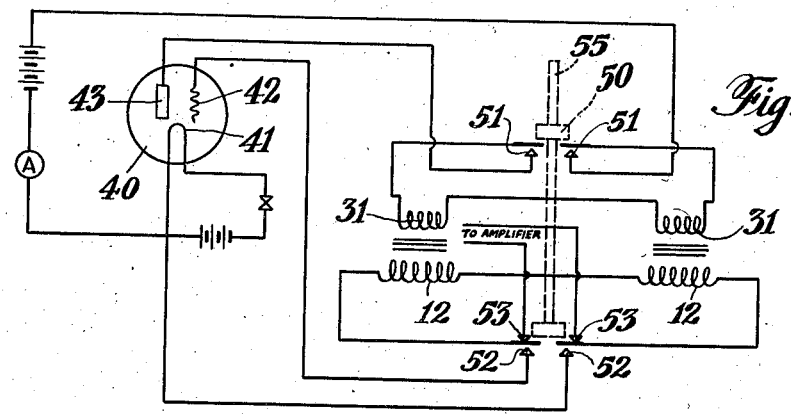
Fig. 2 is a wiring diagram illustrating the principle of testing embodied in this invention.

In Fig. 2 I have disclosed a diagrammatic representation of one method of, and means for, testing coils to discover if they are not in proper functioning condition, as for instance, if they have been short-circuited wholly or in part, or if the circuit through them has been completely broken. In the form of invention shown in Fig. 2, I test a pair of coils at one time but it will be apparent from the following description that a single coil may be tested by the same method.

The testing method disclosed in Fig. 2 consists in establishing an oscillatory circuit and causing the detector coil under test to affect said circuit, of which it is a part, so as to produce a change in the conditions of oscillation. If there is no defect in the detector coil, or external load across the coil, a certain indication will be obtained upon a D. C. ammeter in the plate circuit of the oscillator. If the detector coil is open-circuited, no oscillatory circuit is completed, the grid circuit so being opened. If the detector coil is otherwise defective, as described, the amplitude of oscillation will be either partially decreased or reduced to zero. Any such change in amplitude of oscillation from that obtained with a perfect coil is indicated by the D. C. ammeter, a smaller reading resulting when defects are present. Such internal defects as shorts or excessively low terminal resistance are so characteristically distinguished from "opens", the latter resulting in a slowly increasing D. C. plate current, indicated by the ammeter, due to the opened grid of the oscillator. One means of establishing the oscillatory circuit is shown in Figs. 2 and 3.

In Fig. 3 I have shown one of the detector coils 12, mounted upon a core 30, and on the same core 30 I mount an auxiliary coil 31 in inductive relation to coil 12. A similar construction is to be found in each of the detector coil casings.

It will be seen that the circuit through the detector coils 12 normally extends to an amplifier whose output operates an indicator. When the detector coils are to be tested for defects, all load must be removed from the detector coils, and therefore I provide means, in this instance, within the car body, whereby the circuit from the detector coils to the amplifier is broken and said detector coils are connected into the oscillatory circuit. Said circuit may comprise an ordinary oscillatory tube 40, having a filament 41, grid 42 and plate 43, the plate circuit extending through the test coils 31 when a plunger 50 is operated from within the car body to close contacts 51 and 52 and open contacts 53, the latter leading to the amplifier. Said circuit-operating device 50 may be actuated from within the car body by pressing a button or plunger 54, which may operate a Bowden wire 55, within a shield 56. Said contacts 51, 51, 52 and 53 may be housed within the frame of detector carriage 13 as shown in Fig. 1.

It will be seen that when the contacts 51 and 52 are made and contacts 53 are broken, the output from the oscillator 40 extends from plate 43 through auxiliary coils 31, which, by reason of inductive coupling to detector coils 12, establishes a feed-back into the grid 42 to set up the oscillation. The extent of oscillation may be read upon a direct current ammeter A. If detector coils 12 are in fully operative condition, predetermined maximum reading will be obtained upon meter A. However, if the detector coils 12 are defective, as, for instance, by having several turns shorted, or by being completely shorted, or if the circuit through the coils is completely broken, then the reading on meter A will be either reduced to a corresponding degree, or will slowly increase from the normal D. C. plate current reading to the reading corresponding to the open grid potential assumed by the grid of the oscillator tube.

Since there are two pairs of coils in each search unit shown in the Fig. 1 form of the detector mechanism, a similar unit as just described will have to be provided for the other pair of coils within the detector carriage, including a second button similar to 54 within the car body. Similarly, since there is another detecting mechanism cooperating with the other rail, additional testing means similar to that just described, will have to be provided for the search unit at the other side. If each individual coil is to be tested separately, then four such testing devices would have to be provided for each search unit and a total of eight for the two units at the two sides.

Figure 4:
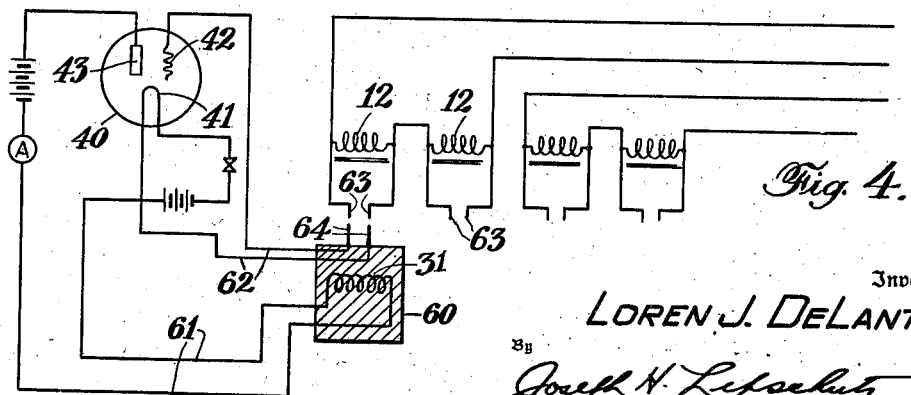
Fig. 4 is a view similar to Fig. 2, showing another application of the same testing principle.

In Fig. 4 I have shown a form of my invention wherein a separate independent testing unit may be connected to each coil for testing the same. This obviates the necessity of building the detector coils 12 with an auxiliary coil 31 permanently mounted adjacent thereto. In this form of the invention the auxiliary coil 31 is contained in a movable unit 60, which is carried at the end of conductors 61 and 62 and may be connected to the coil assembly to be tested at will. For this purpose each coil 12 is shown as provided with open connections 63 which may extend into the ends of the cylinders in which said coils are mounted. The unit 60 is provided with connections 64 adapted to engage the connections 63, and when said engagement is effected, auxiliary coil 31 is in inductive relation with respect to the detector coil 12 which is being tested. The operation thereafter is as already described in connection with Fig. 2.

In Figs. 5 and 6 I have disclosed a modified form of my invention. Instead of incorporating the contacts 64 in the same member 60, which carries the auxiliary coil 31, I may provide a separate lead line 70, carrying contacts 64', adapted to engage contacts 63', which in this instance are housed in the upper portion of the detector carriage frame 13. The auxiliary coil 31 is contained within the member 60', said member having a concave surface adapted to fit beneath the cylinder which houses the detector coil to be tested, so that when housing 60' is in position the auxiliary coil 31 and the detector coil 12 to be tested are in inductive relation to complete the oscillatory circuit. Both in Fig. 2 and Fig. 6 the testing unit may be contained in a separate instrument case 71, which is portable and carries the leads 70 and 72, which may be connected as described to the search unit when a test is to be made.

In the diagram of Fig. 5 I have disclosed certain additional features which may be applied to the wiring diagram of Fig. 2. These include a stop or button 80, which upon being depressed will short-circuit the detector coil 12 in order that a predetermined value of D. C. plate current may be established and observed upon meter A, either when the circuits are in position to allow oscillation or under non-oscillatory or partially oscillatory conditions. It will be understood that this is necessary because when the oscillatory circuit is established between the detector coil 12 and the auxiliary coil 31, the current flowing through meter A is the sum of the plate current plus the average current due to the oscillation.

In addition I have provided a means in Fig. 5 whereby the resistance between the grid and filament, that is, between points 75 and 76, may remain constant in spite of rheostat adjustment to maintain a fixed voltage on the grid 42. Thus, for instance, the voltage for said grid may be supplied from battery 81 and said voltage may be controlled through a potentiometer comprising resistance 82 and sliding contact 83. As the contact 83 is moved along the potentiometer to control the voltage applied to the grid, it will be seen that a variation in resistance is set up between points 75 and 76 in the oscillatory circuit because the path of oscillation extends from point 75 along the arrows to point 76. As contact 83 is moved to the right or left in said figure, the portion of the potentiometer contained in the oscillatory circuit between contact 83 and point 84, is increased or decreased correspondingly. To offset the portion of resistance thus introduced, I incorporate a second resistor 85, with which a contact 83' integral with contact 83 engages. It will now be seen that as the resistance between points 83 and 84 increases or decreases the resistance between points 83' and 84' decreases or increases respectively to compensate for the variation in resistance which would ordinarily be introduced and thus leaves the resistance between points 75 and 76 substantially constant.

Another method of compensating for the variations in resistance described above is shown in Fig. 8. In this form of the invention a condenser 95 of large capacity is connected around the variable resistance 82, 83. The capacity of this condenser is so large that the reactance between points 84 and 76 is negligible at oscillatory frequency and variations in resistance 82 are no factor because the condenser offers a low impedance by-pass.

In Fig. 7 I have disclosed still another modification of my invention. This form may operate upon either of two principles. I employ within the testing unit two auxiliary coils 31 and 31'. By one method of operation of this form of my invention the testing coils 31 and 31' are so positioned relative to each other that no oscillation is normally set up between them although said coils bear to each other somewhat the same relation as coil 31 bore to the detector coil 12 in the other forms of the invention. No oscillation is set up, however, because the degree of coupling is controlled by increasing the reluctance of the magnetic circuit between them. Thus I have shown said coils provided with iron cores 90, 90', which form together an incomplete magnetic circuit. When, however, the testing unit comprising the said coils 31 and 31' and their cores 90, 90' are brought into testing relation with detector coil 12, the core 30 of said coil completes the magnetic circuit through the cores 90, 90', thus decreasing the reluctance of said circuit and causing an oscillation to be set up. In this case, also, the degree of oscillation as compared with a predetermined degree of oscillation caused by a perfect detector coil, gives an indication of the condition of the detector coil under test.

By another method of operating the Fig. 7 form of my invention, the coupling between test coils 31 and 31' may be such that an oscillatory circuit normally exists. The positioning of the test unit in test relation with respect to detector coil 12 will in this instance serve not to create the oscillation but to modify the same in accordance with the condition of the detector coil.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A device for investigating the condition of detector coils in a flaw detector mechanism, said mechanism including a detector circuit in which said coils are normally connected, an oscillatory circuit in which said coils are adapted to be connected, means whereby said coils may be disconnected from said detector circuit and connected into said oscillatory circuit when said coils are to be tested, and means for measuring the current in said oscillatory circuit.

2. A device for investigating the condition of detector coils in a flaw detector mechanism adapted to be mounted beneath a flaw detector car, said mechanism including a detector circuit in which said coils are adapted to be connected, an oscillatory circuit in which said coils are adapted to be connected, and means operatable from within the car for selectively rendering said circuits effective.

3. A device for investigating the condition of detector coils in a flaw detector mechanism, said mechanism including a detector circuit in which said coils are adapted to be connected, said device comprising a test coil adapted to be positioned in inductive relation to the detector coil under test, and an oscillatory circuit including a feedback, said feed-back including said test coil and said detector coil under test.

LOREN J. DE LANTY.